US012483927B2

(12) United States Patent
Geekee et al.

(10) Patent No.: US 12,483,927 B2
(45) Date of Patent: Nov. 25, 2025

(54) SYSTEM AND METHOD OF INTEGRATING STANDARD AND NON-STANDARD NETWORK SERVICES

(71) Applicant: Shabodi Corp., Toronto (CA)

(72) Inventors: Harpreet Geekee, Oakville (CA); Raghav Kamran, Bangalore (IN); Vikram Chopra, Toronto (CA); Nitin Sood, Mississauga (CN)

(73) Assignee: Shabodi Corp., Toronto (CA)

( * ) Notice: Subject to any disclaimer, the term of this patent is extended or adjusted under 35 U.S.C. 154(b) by 0 days.

(21) Appl. No.: 17/885,977

(22) Filed: Aug. 11, 2022

(65) Prior Publication Data

US 2023/0344703 A1 Oct. 26, 2023

Related U.S. Application Data

(60) Provisional application No. 63/231,837, filed on Aug. 11, 2021.

(51) Int. Cl.
| | | |
|---|---|---|
| *H04L 67/56* | (2022.01) | |
| *H04L 41/0803* | (2022.01) | |
| *H04W 24/02* | (2009.01) | |
| *H04W 28/02* | (2009.01) | |
| *H04W 80/10* | (2009.01) | |

(52) U.S. Cl.
CPC ......... *H04L 41/0803* (2013.01); *H04W 24/02* (2013.01); *H04W 28/0268* (2013.01); *H04W 80/10* (2013.01)

(58) Field of Classification Search
None
See application file for complete search history.

(56) References Cited

U.S. PATENT DOCUMENTS

| 11,765,623 B1* | 9/2023 | Cai | H04W 28/24 370/229 |
|---|---|---|---|
| 2013/0088983 A1* | 4/2013 | Pragada | H04W 24/08 370/252 |
| 2020/0344140 A1* | 10/2020 | Cooblall | H04L 43/0852 |
| 2022/0345881 A1* | 10/2022 | Tan | H04L 63/20 |

FOREIGN PATENT DOCUMENTS

| CN | 116367137 A | * | 6/2023 | |
|---|---|---|---|---|
| WO | WO-2020069036 A1 | * | 4/2020 | H04L 41/0806 |

* cited by examiner

*Primary Examiner* — Natisha D Cox
(74) *Attorney, Agent, or Firm* — Sam Pierce

(57) ABSTRACT

In a network with varying levels of Quality of Service, where a UE connects to an application through a network or network slice whose service characteristics are not well defined to the user or the application provider, poor levels of service may be experienced. This may be attributed to the application being poorly designed, where in fact it is related to the UE and application connecting through a network that is not properly configured for the intended usage. To mitigate these issues, applications and UEs can be provided access, directly or indirectly, to a network configuration environment to allow for a standardized QoS request to be issued to the network entities between the UE and application execution environment.

18 Claims, 11 Drawing Sheets

SYSTEM AND METHOD OF INTEGRATING STANDARD AND NON-STANDARD NETWORK SERVICES

CROSS REFERENCE TO RELATED APPLICATIONS

This application claims the benefit of priority to U.S. Patent Application Ser. No. 63/231,837 filed Aug. 11, 2021 and entitled "System and Method of Integrating Standard and non-Standard Network Services" the contents of which are incorporated herein by reference.

TECHNICAL FIELD

This application relates generally to a network element for instructing the configuration of a connection, and more particularly to a network element that, in conjunction with a request received over the user plane, generates network configuration instructions associated with the connection between the UE and an application for implementation by management plane and/or control plane entities.

BACKGROUND

The evolution of wireless communication networks has resulted in the deployment of Fifth Generation (5G) wireless networks. 5G networks provide a number of improvements over the previous generation of wireless networks, among them is the ability to support differentiated levels of service throughout the network. This can be done in any number of different ways. In the Radio Access Network (RAN), which is typically defined as the part of the network that supports the air interface and is thus often viewed as the network of 5G Node B (gNB), differentiated service is often provided through the dedication of different Data Radio Bearers (DRBs) to different Quality of Service (QoS) characteristics. In the network core (also referred to as the core network or the packet core) differentiated levels of service may be provided through the use of network slicing. Network slicing allows a common set of network resources to be used as a substrate for a variety of independent networks and allows for the creation of isolated virtual networks over which different traffic flows can travel. Different network slices may have different network topologies, different capacities, latencies and ability to support different types of network traffic. Network slicing allows a network operator to support different services that require very different characteristics without having to support each service on the same network by over provisioning resources to each connected device so that the needs of each service are properly supported.

In some implementations, an end-to-end slicing can be offered through an allocation of different sets of DRBs to different network slices. Thus, all traffic received over a given DRB is immediately known to be associated with a specific network slice. Conversely, all traffic received at the gNB from a particular network slice can be transmitted over an associated downlink channel.

In the network standardization process, network equipment manufacturers, user equipment manufacturers and network operators take care to ensure that there is interoperability between devices. Typically, this has focussed on the ability of a standards compliant User Equipment to connect to a base station regardless of who manufactured either node. As networks became more advanced, it became important to also define the interactions between components within the core network, to allow for core networks to be heterogeneous networks. However, the 5G network defines a role of User Plane Functions (UPF), which are accessed by the user and reside within the Core Network. Where the network operator is providing the service supported by an application or UPF the characteristics of the network slice can be configured to support the needs of the application. However, standardization has not been directed to allowing an application, particularly an application outside of the core network, to define the connectivity requirements (or other application specific requirements such as network capability allocations) for the rest of the network. Similarly, standardized management and control plane entities lack interfaces that allow a network application, outside of the network core, to easily transmit requests for either configuration modifications or adjustments in network capability allocations in view of application requests or requirements, without in depth knowledge of the network configuration. If a single application is providing a service to users of different network slices, or different networks, there is no standardized mechanism to allow either the user or the application to select the characteristics of the network used to connect the UE to the application.

Accordingly, it may be beneficial to provide a user or an application a mechanism to provide characteristics that can be used to define the characteristics of the connection between the UE and the application. As of Release 17 of the 3GPP 5G standards there is no standardized mechanism designed to allow a network accessible application to define or modify any of the QoS network allocations, or other parameters of the intervening network that would have an impact on the apparent connectivity between the UE and the network application There has been discussion of allowing a UE to participate in resource allocation negotiations, but as will be discussed below, this is insufficient in many situations. Notions of using the UE as a proxy for the application typically stem from the fact that to connect to the network, the UE must authenticate with the network, and is thus somewhat known and trusted. In 3GPP Release 17, applications outside the operator network are not considered to be trusted entities. From the perspective of the network, the UE connects to a network using a DRB that is associated with a QoS. The UE accesses the application over this connection. If the connection is underprovisioned, there is no simple mechanism to allow the UE to make this determination automatically. From the perspective of the application, there may be a number of different users, each of whom may be connecting over different network slices, and using different access networks. Such a scenario will mean that the user will have information associated with a desired QoS, but no information about how to enable such a connection. The network operator will only see traffic flowing to the application or application server over its connections, so the carrier will not understand the need to adjust a given connection. The Application itself will have information that can be used to identify how to best serve a number of different connections, but unless the application is implemented by a carrier or provided access to carrier information, this information is not currently usable. Each different network provider may have information that is useful to the application, but this information will be opaque to the application. As such, the ability for the application service provider or the network service provider to properly provision the connection is limited under current standardization methods and services.

This makes development and support of applications difficult in a 5G environment, as the application developer may design the application to be run under defined conditions, but in the execution environment there may be no manner in which to ensure that the UE accessing the application has a connection that meets the defined conditions. Thus, an application has no ability to determine the QoS of the UE connected to it, nor does it have a mechanism that allows it to specify a QoS for the UE. (Although discussed in this example as being associated with the QoS, it should be understood that this is a simplified example, and other configurable parameters including resource allocations of the application service provider and network operator are opaque to each other.) To make matters more complicated, if a single application is designed to support connections from a plurality of different networks, the application may have no mechanism to determine which network or network slice the UE has connected over.

This introduces an incredible amount of complexity for the application to manage, none of which is apparent to the UE. Accordingly, a UE that does not have an appropriate QoS, or that is communicating with the application over a DRB that is misclassified, will experience an unexplained poor level of service. This results in a poor quality of experience.

SUMMARY

It is an object of the aspects of the present invention to obviate or mitigate the problems of the above-discussed prior art.

In a first aspect of the present invention, there is provided a method for generating configuration information associated with a network element. The method comprises the steps of receiving a connection configuration request associated with an application executed on a UE, and at least one of an application server, a network connecting the UE to the application server, and a node or network function within the network; transmitting, towards a network element associated with the received connection configuration request, configuration information determined in accordance with the received connection configuration request.

In an embodiment of the first aspect of the present invention, the connection configuration request is transmitted by one of the UE, the application server, a proxy for the UE and a proxy for the application server. In another embodiment, the connection configuration request is transmitted by the application server. In a further embodiment, transmitting towards the network element comprises transmitting a request to configure the network element to a network function within a management plane. In another embodiment, transmitting towards the network element comprises transmitting a request to configure the network element to a management or control plane network function and optionally, the request to configure is transmitted to a network orchestrator via a management plane entity. In another embodiment, transmitting a determined UE configuration towards the UE. In another embodiment, the method further comprises receiving a connection configuration request from the UE, and transmitting towards the UE a UE configuration determined in accordance with the configuration request received from the application server. In another embodiment, transmitting configuration information comprises transmitting to each of a plurality to network elements, configuration information associated with a respective one of the plurality of network elements.

In some embodiments, the method is carried out outside of a network in which the network element resides. The network in which the network element resides may optionally be a core network of a 3GPP compliant network. The network in which the network element resides may be a radio access network, which itself may be 3GPP compliant.

In accordance with an aspect of the present invention, there is provided a method for configuring a connection within a managed network. This connection can be a newly created connection, or it may be an existing connection being reconfigured. The method comprises receiving, from a node through a connection outside a managed network, a request associated with a connection between nodes within the managed network; generating, at an application description function, in accordance with the received request, configuration information associated with the connection; and transmitting, towards a network element associated with the connection, a configuration request associated with the generated configuration information.

In an embodiment of this aspect, the request received from the node outside the managed network is formatted in accordance with an outward facing Application Programming Interface. In another embodiment, the connection configuration request is received from one of an application server, a user equipment node connected to the managed network, a proxy for the application server and a proxy for the user equipment node. In a further embodiment, the configuration request is formatted in accordance with an Application Programming Interface (API) associated with the network element, and optionally the API is different than an outward facing API associated with the received request.

In another embodiment, the request from the node outside the managed network is received over the data plane of a network other than the managed network. In some embodiments, the network element associated with the connection is within one of a control plane of the managed network and a management plane of the managed network. In a further embodiment, transmitting the configuration request towards the network element comprises transmitting the configuration request to a second network element within one of a control plane of the managed network and a management plane of the management plane, and optionally, the configuration request is transmitted towards a network orchestrator via a network entity in a management plane In some embodiments, the configuration request is transmitted towards a user equipment (UE) node connected to the managed network, and wherein the configuration request is a request for configuration of a connection associated with the UE. Optionally, the received request is received from the UE and wherein the configuration request is determined in accordance with a second request received from an application server outside the managed network. In another embodiment, wherein the received request is associated with a connection between the UE and the application server.

In another embodiment, generating configuration information comprises generating a set of configuration information data, each of the set associated with a different network element within the managed network; and transmitting a configuration request comprises transmitting to each of the different network elements a configuration request associated with the corresponding subset of the configuration information.

In another embodiment, generating the configuration information further comprises generating a Quality of Service Flow Indicator (QFI) associated with the connection. In other embodiments, the managed network is one of a 5G core network, a 5G Radio Access Network, an Edge Computing Network, a 4G core network, a radio access network, and a Wi-Fi network.

In another embodiment, the connection between nodes within the managed network comprises a plurality of connections spanning different managed network segments. Optionally, connections in the plurality of connections comprise at least one of: a connection between a UE and a base station; a connection between a UE and a radio access point; a connection between a UE and a gNodeB; a connection between the gNodeB and a User Plane Function (UPF); a connection between the gNodeB and a gateway; a connection between two UPFs, and a connection between a gateway and a UPF.

In another embodiment, the connection between nodes within the managed network comprises a connection associated with an Internet of Things (IoT) device.

In another aspect of the present invention, there is provided an Application Description Function (ADF) for generating configuration requests associated with connections within a managed network in accordance with requests received from outside the managed network. The ADF comprises a first and second network interfaces, along with a processor. The first network interface allows the ADF to receive requests from outside the managed network. The second network interface allows the ADF to transmit requests to a network element within the managed network. The processor can execute instructions stored on a computer readable medium that when executed cause the ADF to carry out the above described method of the previous aspects along with each of the embodiments.

BRIEF DESCRIPTION OF THE DRAWINGS

Embodiments of the present invention will now be described in further detail by way of example only with reference to the accompanying figure in which.

In the above described figures like elements have been described with like numbers where possible.

DETAILED DESCRIPTION

Figure 1:
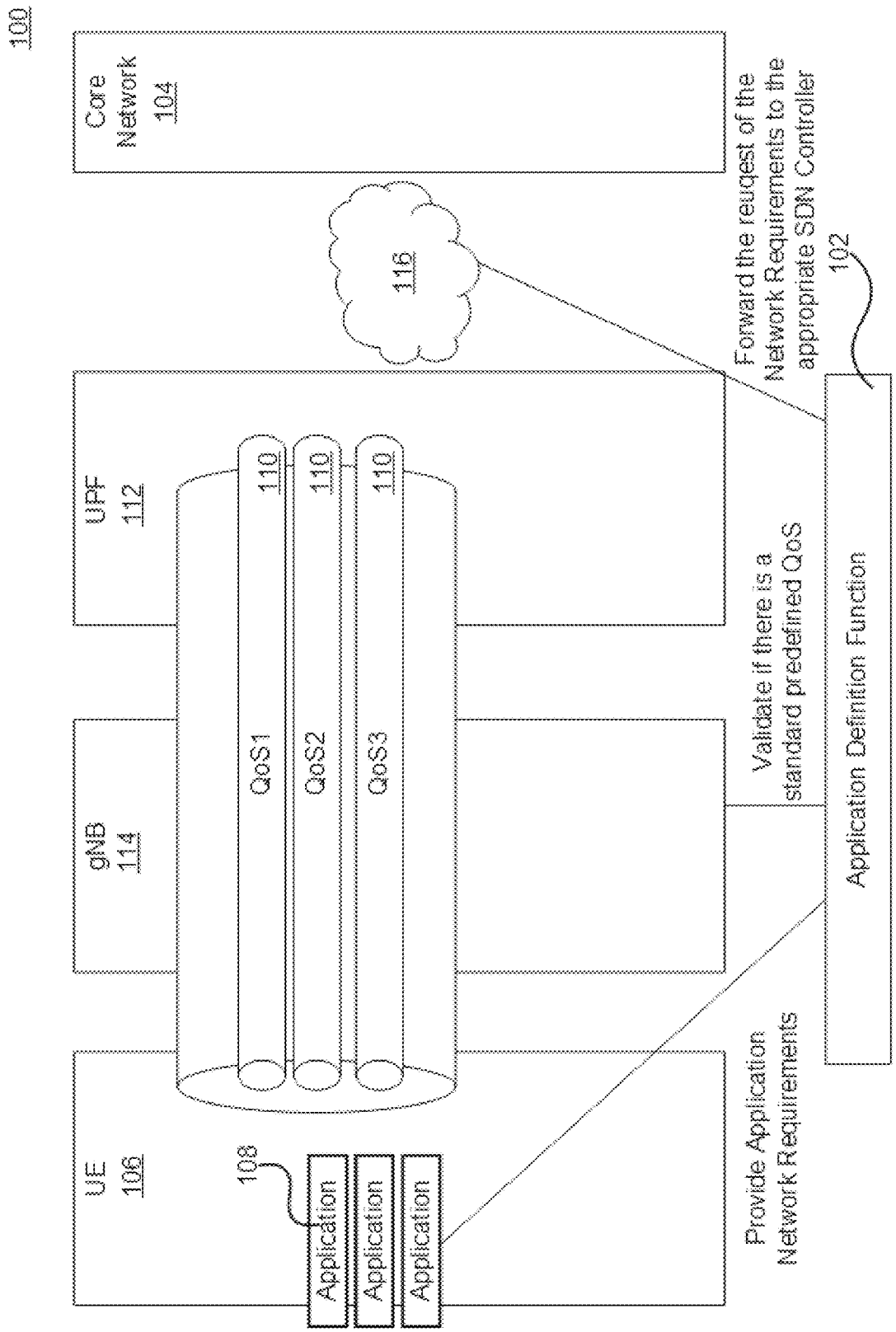
FIG. 1 illustrates a model for connecting UE based applications to network entities.

In the instant description, and in the accompanying figures, reference to parameters may be made. These parameters are provided for the enablement of a single embodiment and should not be considered to be limiting or essential. It should be understood that the parameters discussed below are used for the sake of explaining an embodiment. It is not intended to convey either that particular parameters are essential, nor is the following discussion intended to be exhaustive in discussing the parameters upon which the Application Definition Function will operate.

In dynamic networks, such as 5G networks, the network can be configured to serve any of a number of different needs. When a UE connects to a network based application, there may be a number of networks through which traffic may flow. Each of these networks has multiple network elements that can be configured to support the connection. Those skilled in the art will appreciate that a variety of different configuration parameters can be established for each network element. In the discussion below, both network slicing and QoS will be discussed. In other embodiments, different configuration parameters may be used. As an example, in some embodiments, power consumption parameters of the network element may be specified if the network connection is intended to be prioritized for an eco-friendly application. In another example, the configuration parameters may be associated with processing capacity at given nodes within the connection path (also referred to as compute resources), which can allow for a customized service function chain to be enabled so that traffic can be subjected to appropriate network analysis and processing, In the following discussion configuration parameters will be discussed with a focus on setting up a Quality of Service guarantee for traffic between the UE and an application server. It should be understood that this discussion is intended to be explanatory, and is an example. The following discussion should be understood to not be limiting.

In a 5G network, varying levels of service can be provided. It may be possible for the radio edge to provide one set of differentiated levels of service, and for the core network to provide another set of differentiated levels of service. In some examples, these levels of service may be associated with a QoS guarantee. In some networks, different QoS levels may be associated with different network slices.

The use of network slices allows for differentiated levels of service to be offered, without requiring all connections to be provisioned for the highest level of service. For example, a 5G network handset designed to allow a user to stream and download content while moving through the network, and a stationary device intended for use in a smart-grid that only intermittently generates low levels of traffic, are both UEs. However, they have very different needs in terms of both bandwidth and mobility configuration and consumption. Instead of provisioning each device to consume the same resources, these devices can be supported using different network slices. Each slice may be specifically designed to support the traffic needs of the intended UEs. Similarly, it may be advantageous for a network operator to support two different network configurations for different UEs within the same class of device. For example, two users with identical UEs may have different needs pertaining to latency and bandwidth. A first network slice may be designed to carry low-latency traffic associated with real-time communications, while a second slice may be designed for larger amounts of data transfer with less concern for latency. An application designed for one of these slices may not do an acceptable job of supporting a UE that connects over the other slice. In some examples, there may be a third type of slice, designed for both low latency and high bandwidth, but it may be more expensive for a user to access. A UE whose subscriber has paid for access through this slice may be well served in connecting to the application through this slice, though it may be more expensive than necessary. Because standardization bodies, like the 3GPP, typically focus their efforts on the standardization of the interaction between a UE and an element within the network operator network, or between two elements within the network operator network, the focus of allowing adjustments in network resource allocations are typically focussed either on nodes within the network operator network (which can typically interact with control plane network functions), or on the UE. Although through communication with control plane entities such as an AMF or SMF, a UE could request different a QoS or a different allocation of network services, it is an inefficient situation. An Application Server may want a particular allocation of network resources, but the network may be able to provide such an allocation. If the UE makes a request on behalf of the application, it becomes a node in the middle of a negotiation. By allowing an application to interact with the network elements without a UE in place, the application is better served to negotiate a modified resource allocation, and it may be able to identify an otherwise sub-optimal network resource allocation that can become very usable through a modification to the configuration of application resources.

Management and creation of network slices within a 5G network often rely upon network virtualization technologies that are considered common in the computing industry. Network Function Virtualization (NFV) allows network functions to be created within the network slices. In some embodiments, NFV is used to create a completely virtual network entity, specific to that slice, on general purpose computing hardware, while in other embodiments, a dedicated network function using specialized hardware resources is used with different slices of the network function being allocated to different slices of the network. The use of NFV allows for the virtualized function to be configured to meet the needs of the particular network slice. As the needs of a slice increase, the virtualized function can be allocated new resources to expand the function, or a new instance of the function can be introduced allowing for different network designs and architectures to be implemented.

The configuration of parameters within a virtual network can also be performed for the network connections. Changes in the bandwidth allocated to a connection, or to the latency between virtual nodes can be made through entities within the control plane of the 5G network. Management and Orchestration (MANO) functions may be used in the instantiation of virtualized functions within the network. However, access to these functions is generally considered to be off-limits to anyone other than the network operator for both security and reliability reasons.

The Third Generation Partnership Project (3GPP) is the organization responsible for setting out the standards under which a 5G network operates. 3GPP specifications have set out standards for how a UE connecting to a 5G network is supposed to handle the different QoS levels that may be offered. It has also set out exemplary QoS allocations that many operators have adopted, with the notion that these QoS allocations should address the necessary QoS levels. Applications can be designed with these QoS levels in mind, but it may be difficult for the application to determine the QoS level of different UEs that may be connecting through different networks and network slices.

SA2 and SA5 are 3GPP subgroups that define, respectively, the network functions on the control plane and how they configure the user plane connections, topology and functions, and the management plane and its respective functions. Functions on the Management Plane are used by a network operator to define business and charging rules, that can then be turned into rules and network elements that are created and enforced by control plane entities. Typically, these entities are only visible to a network operator. The UE may have limited exposure to a Control Plane Entity, and even then only for short periods of time, and will not see the existence of Management Plane Entities. SA6 is a 3GPP standardization subgroup that is focussed on enabling support for Mission Critical applications and enablement of application access to the network. Typically this standardization is directed to the support for mission critical applications within (or with access to the control plane of) a network operator network. Because each network element within the network operator network has a different set of configuration parameters, the overall set of configuration parameters is incredibly large. An application server outside the operator network has no mechanism to handle this effectively, or to even properly gain access to sufficient information about a plurality of different network operators that may be used by users for access.

From the perspective of a network operator, defining a relatively small number of QoS levels is convenient. It reduces the complexity of the networks, and allows for simplified radio management, network engineering and device connection mechanisms. Applications within the network can be allocated QoS rules by a control plane entity such as the Access and Mobility Management Function (AMF). A core network with reduced complexity allows for easier validation, and is reflected by a limited number of Software Defined Function (SDF) templates.

These configurations and simplifications were designed, as noted before, by 3GPP discussions which are driven by Access and Core Network equipment vendors and network operators. UE manufacturers are typically only interested in air interface parameters, and so they may participate and drive discussions in those areas. They may be interested in how the UE will be provided information associated with a QoS, but they do not tend to be interested in further details. Thus, the rules and modes of operation are typically defined by network operators, without consideration for the developers of applications that will reside within the network. This has resulted in a network architecture that makes assumptions about the nature of network applications based not on the capabilities of the 5G networks, but instead are based on the use cases designed for previous generations of networks. Where previous generations of networks did not account for so-called Over-The-Top (OTT) applications, which are applications that are simply accessed by the user over top of the network connectivity provided, 5G networks can, if configuration is possible, enable applications that reside within the network and engage the network operators in provision of services. These applications can be more tightly coupled to the 5G networks, but to enable this, the application must be able to be supported with connections with a QoS level that meets the need of the application. To make it sufficiently user friendly, the application should not overload the user with technical information that must then be matched up to service offerings from a mobile network operator. A mechanism for the application to ensure that the UE is provided the required QoS level is needed. Involvement of the UE or an application in selecting a QoS level are largely outside the scope of the standards set by SA2 and SA5 which are focussed on the needs of the operator, not of the application to which the operator provides access.

Although discussed here in the context of a 5G network, it should be understood that a core network may be configured according to a number of different standards, including those of the Long Term Evolution (LTE) standards, while a number of different radio access technologies can be supported, including 5G Radio Access (5G New Radio), 4G Radio Access (also referred to as LTE), and WiFi. Network resources, in either the core network or the RAN may also include so-called edge computing networks.

To provide applications with the ability to contribute or control the service levels provided to a UE, which has already connected to the network, an out-of-band connection management layer is proposed. This connection management function allows for applications to provide network requirements, for these provided network requirements to be validated against existing QoS levels (such as the QoS levels defined in standards, and possibly supplemented by additional QoS levels), and given an acceptable match, forward a request for these network requirements to an Software Defined Network (SDN) Controller that can provide a UE-to-Application network connection that meets (and possibly exceeds) these requirements or to adjust the existing connection so that it meets (and possibly exceeds) these requirements.

As illustrated in FIG. 1 this can be accomplished in a network 100 through the use of network accessible Application Definition Function (ADF) 102. It should be understood that in some embodiments, the ADF 102 can be a function within a 5G core network 104 that is accessible to UEs 106 and applications 108 that reside within the same network as the ADF 102. In other embodiments, UEs 106 and Applications 108 can interact with an ADF 102 that is not restricted to being embedded within the same network as either the UE 106 or the application 108. In this embodiment, the ADF 102 may need a relationship with a core network 104 so that it can determine the available QoS levels 110. The ADF 102 would need to also be able to determine a network identifier from UE specific information provided by the application 108 (which may be resident on the internet, but may also have a component that is resident on the UE 106). It should be understood that the different QoS Flow Identifiers (QFIs) can each terminate at a single point, such as the endpoint of the gNB tunnel. At this point, packets are transported over either the radio edge or through a core network 104 (depending on the particular end of the flow). The ADF 102, being provided information about the core network functionality and configuration, can allow for configuration of the terminating UPF 112 to automatically affix MPLS labels so that traffic can be routed in accordance with the application requirements. The instruction of the UPF configuration can be accompanied by a BGP message to aid in integration. It should be understood that the use of MPLS is for the purposes of explanation and examples. Other routing protocols, such as Source Routing, could be used to similar effect. In environments where at least part of the network is provided makes use of a Metro Ring Protocol-based network, similar directives and procedures can be enacted to influence the traffic flow and treatment, within the bounds of what the network permits. This discussion of alternate protocols is intended to provide examples, and is not to be taken as an exhaustive recitation of the network architectures and protocols that can be used.

The ADF 102 may be provided with a full set of QoS levels that are supported by the network, allowing the ADF 102 to select the appropriate QoS 110. In other embodiments, the ADF 102 may submit a request including an indication of various QoS characteristics it requires for a connection, and will receive in response a QoS level selected by the network 110 in accordance with the supplied QoS characteristics. In FIG. 1 the ADF 102 is shown communicating with a gNB 114. It should be understood that the ADF 102 may communicate with a gNB 114 to determine which QoS levels 110 are supported by the gNB 114, especially in networks in which different segments of the network provide support for different sets of QoS levels. It should also be understood that in some embodiments, the ADF 102 may communicate with another network node, and may simply identify either a geographic region, or may more precisely identify a region using an identifier for a particular gNB. In this manner, the ADF 102 can have a simplified communication structure, where it communicates with a single network entity (or a smaller set of network entities) but can obtain information about the QoS levels 110 offered by each gNB 114. It should be understood that in a network 100 in which the RAN is sliced, the gNB 114 may be a virtual entity specific to a particular slice. This may be implemented using an edge computing platform providing a virtualized gNB, or by a physical gNB that is providing a virtualized entity through slicing. If a virtual gNB is identified, it should be understood that the underlying device that provides these features may provide a number of additional QoS levels, but this is immaterial as they are not offered by the virtual gNB in question. To all devices outside the control or management planes, the virtual gNB will be indistinguishable from a physical gNB. It should be understood that in some embodiments, an LTE compliant eNodeB (eNB) may be connected to a 5G Core Network 104. The ADF 102 can be used to ensure configuration of the traffic leaving the eNB so that its traffic is formatted and directed to the appropriate 5G Core Network element. 5G standardization was designed to create a 5G RAN separate from a 5G Core Network, with the assumption that the 5G RAN would be likely deployed before a 5G Core. However, due to a number of factors, including a delay in the allocation of 5G spectrum, 4G RANs are being connected to 5G Core Networks. The configuration of eNBs in the 4G RAN to connect to a dynamic 5G Core Network is difficult, but through the use of the ADF 102, an entity within the 5G Core Network can provide the dynamic updates needed to the eNBs without having the expose interfaces that may have security implications.

When the ADF 102 has identified and selected the appropriate QoS level for this session between the UE 106 and the network based portion of application 108, ADF 102 can transmit a request, which may identify at least one of the UE 106 and the application 108, to an SDN controller 116 in the network. Those skilled in the art will appreciate that some networks may provide a single interface node for the ADF 102 to communicate with. This allows all requests for gNB information, and all requests for connections directed to an SDN controller 116, to be authenticated or verified at a single function. This function may act as an authenticator and a proxy for the requests. The function would receive, authenticate and then forward the requests. It may generate the responses to requests on its own, or it may receive the responses from other functions within the network and forward them on to the ADF.

Figure 2:
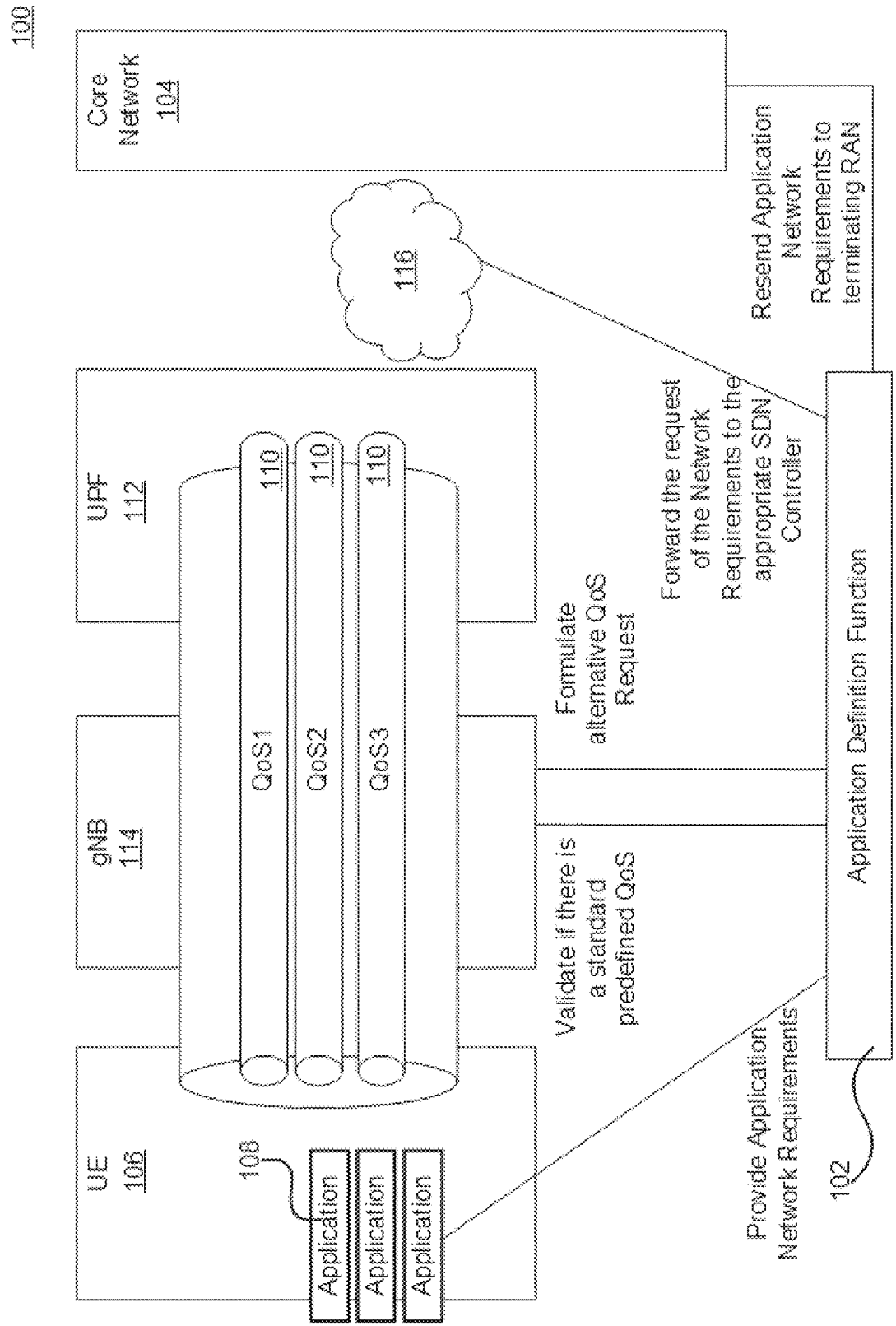
FIG. 2 illustrates a further model for connecting applications to network entities.

In FIG. 2 a process is illustrated that may be followed when a desired QoS level is not available, or when a more relevant QoS level is available. As before, an instance of the application 108 associated with the UE 106 interacts with the ADF 102 to provide network requirements associated with the application 108. The ADF 102 can then send a message to interrogate whether the gNB 114 supports the desired QoS level 110. Based on the results, the ADF 102 can formulate an alternative QoS request. In some embodiments this may allow for a more appropriate QoS level than the initially requested QoS level to be selected. This reformulated request may be sent to gNB 114 (or to the appropriate proxy as discussed above) for confirmation, and then forwarded to the SDN controller 116 (or appropriate proxy). A Core Network entity may, in response to the request transmitted towards the SDN controller 116, transmit Application network requirements to nodes within or associated with the terminating RAN. Those skilled in the art will appreciate that different QoS levels 110 may be associated with the radio access connection between the gNB 114 and UE 106, but they may also be associated with a connection spanning between the gNB 114 and the application 108 and also the far-end devices on the other end of the back haul. This procedure can allow for an end to end connection to be provisioned between the UE 106 and the network portion of application 108 that satisfies the connection requirements of the application 108. Where a 5G network 100 is typically able to provide a connection that satisfies a set of reasonable requirements, the problem of how an application not created by the network operator is able to ensure the provisioning of the network is addressed by having an ADF 102 interact with network entities to allow for this provisioning.

It should be understood that in some embodiments, a network controller may transmit to the UE 106 a re-attach request that instructs the UE 106 to connect to a different network slice, or connect through a different DRB. In this way, even when the UE 106 has connected to a network slice that cannot support the required connection requirements, the network 100 can ensure that the UE-Application connection can be satisfied.

Figure 3:
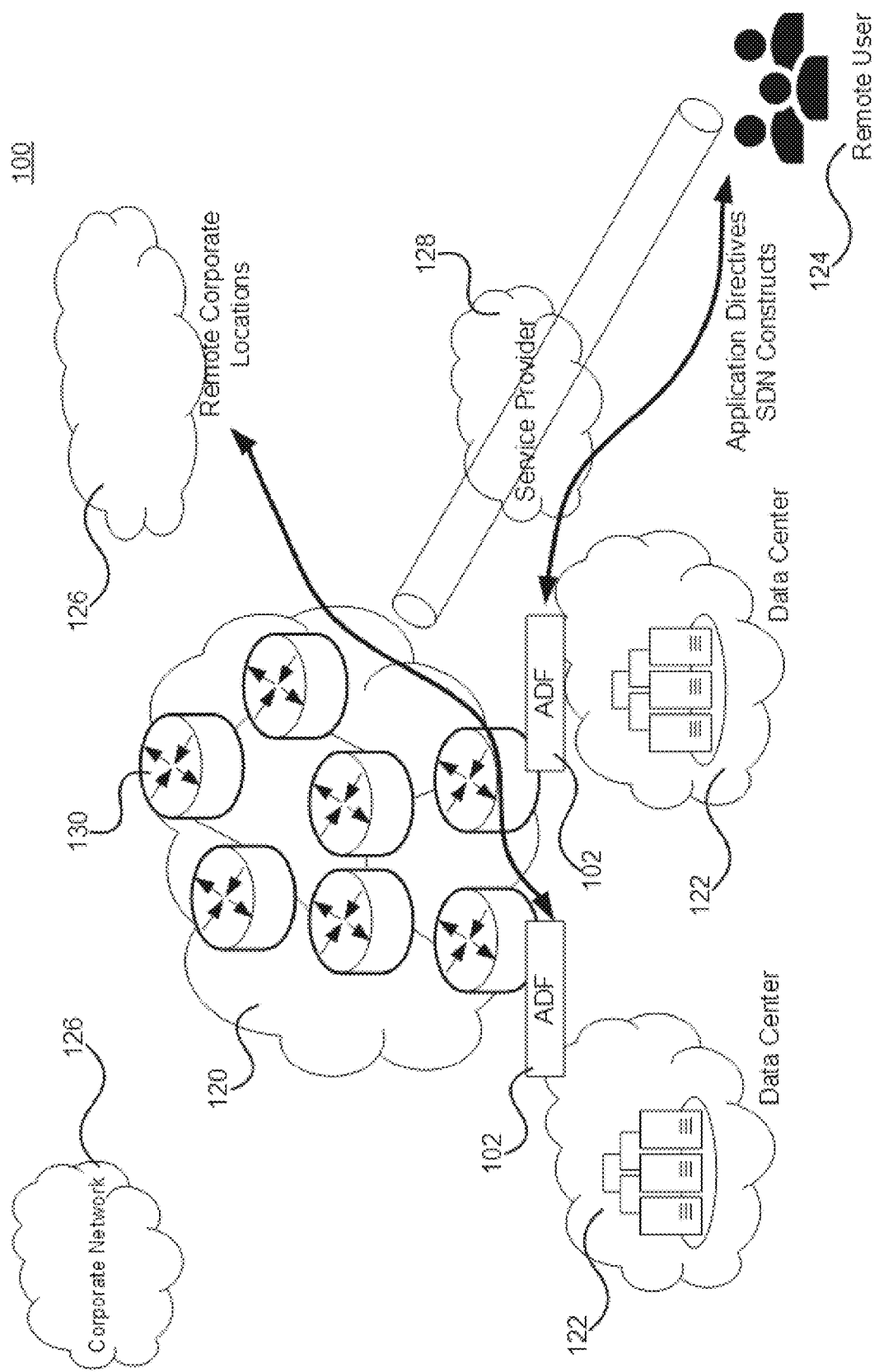
FIG. 3 illustrates an embodiment of a network architecture for using an ADF to enable connectivity.

FIG. 3 illustrates an exemplary embodiment of a network 100 employing an ADF 102 as discussed above. Instances of the ADF 102 are co-located within data centers 122 in private networks 120. The applications 108 can be hosted within these data centers 122 and accessed both through a private network 120 connecting the data centers 122 to employees 124 at remote locations 126, and through a 5G network service provider 128. This can provide a hybrid environment 100 in which data center 122 resources are accessed through a secure and reliable private network 120, and through a public network 128 whose connections can be made secure, but must also be provisioned so that there is sufficient connectivity and reliability to allow access to the applications 108. Network elements (NEs) 130 both physical and virtual may be controlled by SDN controllers with authority over the respective domain. Both Control and Management Planes may be instantiated within this network deployment. The characteristics of the access to applications 108 within the data center 122 are defined by the ADF 102 associated with the data center 122. When access is obtained from the remote locations 126, through known connections, the ADF 102 can transmit instructions to an SDN controller 116 associated with those connections to ensure that the end to end connection between a remote location 126 and the application 108 is properly provisioned to provide access over a network connection having the characteristics that the application 108 was designed for. When access is initiated over a public network 128, such as a 5G network, the ADF 102 responds to the connection with the UE 106 as described above, and determines network identification information associated with the UE connection. This network identification information may be associated with the UE 106, the RAN through which the UE 106 is connecting, and the core network 104 to which the RAN is connected. The ADF 102 can then determine the available QoS levels 110 and select an appropriate level, or it can undertake the negotiation process outlined above. By establishing a QoS 110 for the connection between the UE 106 and the data center 122, the ADF 102 allows the application 106 to be executed with the resources it was intended to support.

Figure 4:
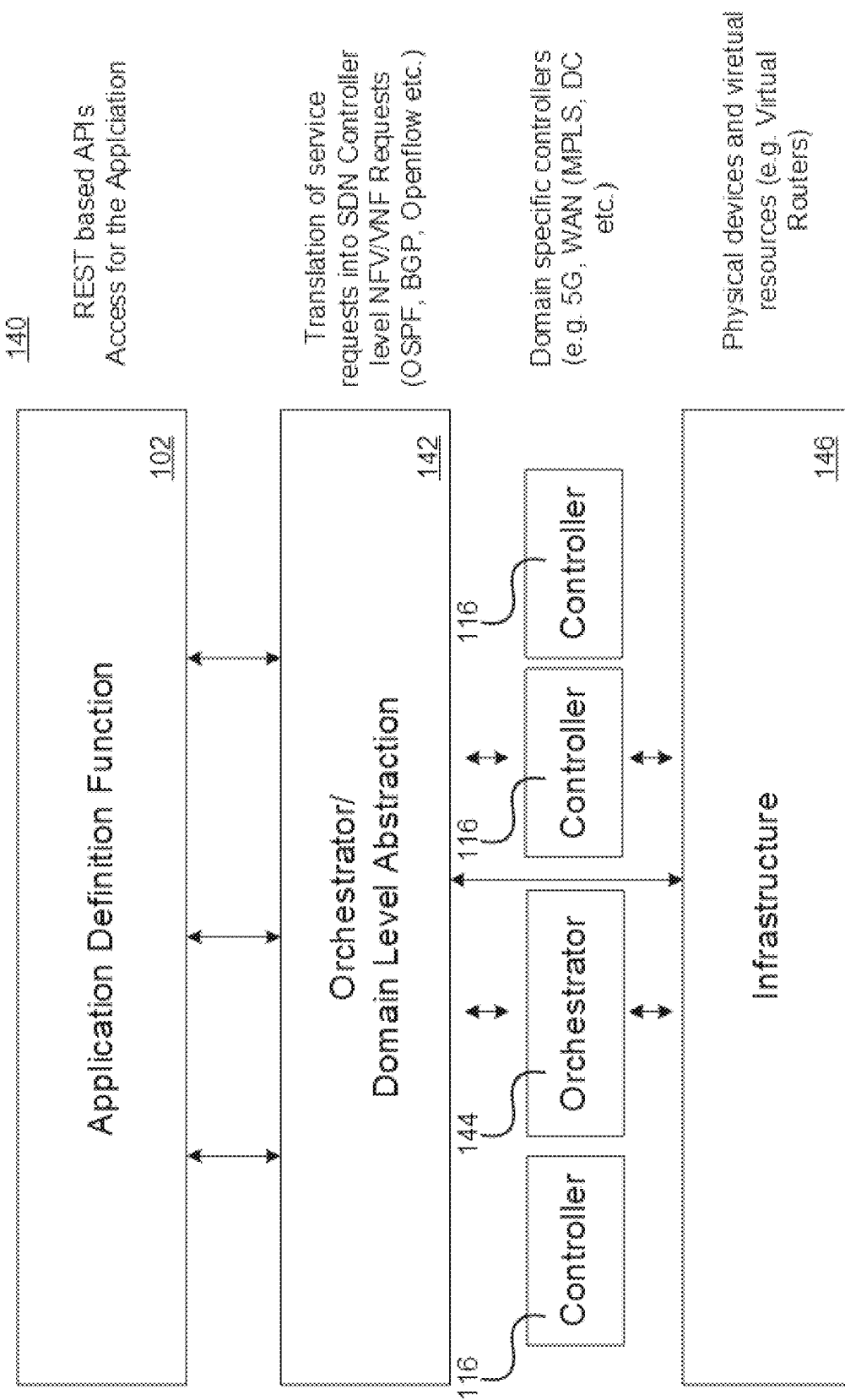
FIG. 4 illustrates an embodiment of an API stack for use in allowing applications to negotiate resource allocations with a network control or management entity.

FIG. 4 illustrates an architecture 140 where the ADF 102 corresponds with a domain level Orchestrator 142 for any number of different configuration parameters, including those associated with establishing a QoS level 110. The ADF 102 may have similar relationships with different orchestrators 142 associated with different mobile networks. In some embodiments all interactions with an orchestrator 142 are defined through a single API, but it is possible for the ADF 102 to support different sets of APIs for different orchestrators. The Orchestrator 142 is typically a network entity in the management or control plane of the network. It communicates with orchestrators 144 and SDN controllers 116 for smaller partitions of the network. The smaller partitions may be geographically distinct segments of the network. In other embodiments they are at least partially overlapping network segments and slices. All of these smaller partitions, segments and slices are supported by an underlying network infrastructure 146. In some embodiments this may be a virtualized infrastructure, which in turn is managed by an orchestrator 144 and controller 116. At some layer though, a physical infrastructure underlies the entire network. This infrastructure may be owned by a plurality of different network operators or by a single entity. It should be understood that the networks described herein having a management or control plane are often referred to as managed networks as the connections between nodes or functions in the data plane are managed to provide security and a reliable quality of service.

The ADF 102, sitting atop the entire network architecture 140 may rely upon a set of RESTful APIs to interact with the applications 108, and a second set of RESTful APIs for interaction with the orchestrator 142. In this way, the ADF 102 can respond to any received request, and transmit requests when needed, to either the application 108 or the orchestrator 142. As noted above, the interface to the orchestrator 142 may involve communication through a proxy that acts to authenticate the communication with the ADF 102 to provide the network operators a level of security.

Interaction between the orchestrator 142 and any of the immediately lower orchestrators 144 and controllers 116 can be governed through a process unique to each carrier or network operator. However, this may also entail use of open standards for these communications including through use of protocols such as OpenFlow, BGP, requests for OSPF calculations, and other such requests. In some embodiments it may involve requests for reconfiguration of existing virtual nodes and connections, which may take the form of a VNF reconfiguration or instantiation request, which may be classified as a NFV instruction. These requests issued to the underlying controllers and orchestrators are determined in accordance with the requests received from the ADF 102. This may involve authentication of the request (which as noted earlier may be done by another entity) and a translation of the request received.

Requests received by SDN Controllers 116 and Orchestrators 144 at a domain specific level are able to make use of the underlying infrastructure 146 to address the domain specific instructions received. By having the request broken down into domain specific instructions at the orchestrator 142, it is possible to ensure that only the domains involved in the connection are provided information about the request. This can provide a degree of privacy, and may reduce the overall complexity by involving only relevant network segments, and it may also allow other network segments to operate undisturbed.

The underlying infrastructure 146 may only be only configured when a domain level controller 116 determines that it has the capacity for this request. In a hierarchical Orchestrator-SDN Controller deployment, each level is typically aware of the overall capacity of the domains below it, but not necessarily the capacity of the individual resources within the domain. Two adjacent domains with similar capacity, may have different usage patterns, and may thus respond with different implementations of the instructions received from a higher level orchestrator.

Figure 5:
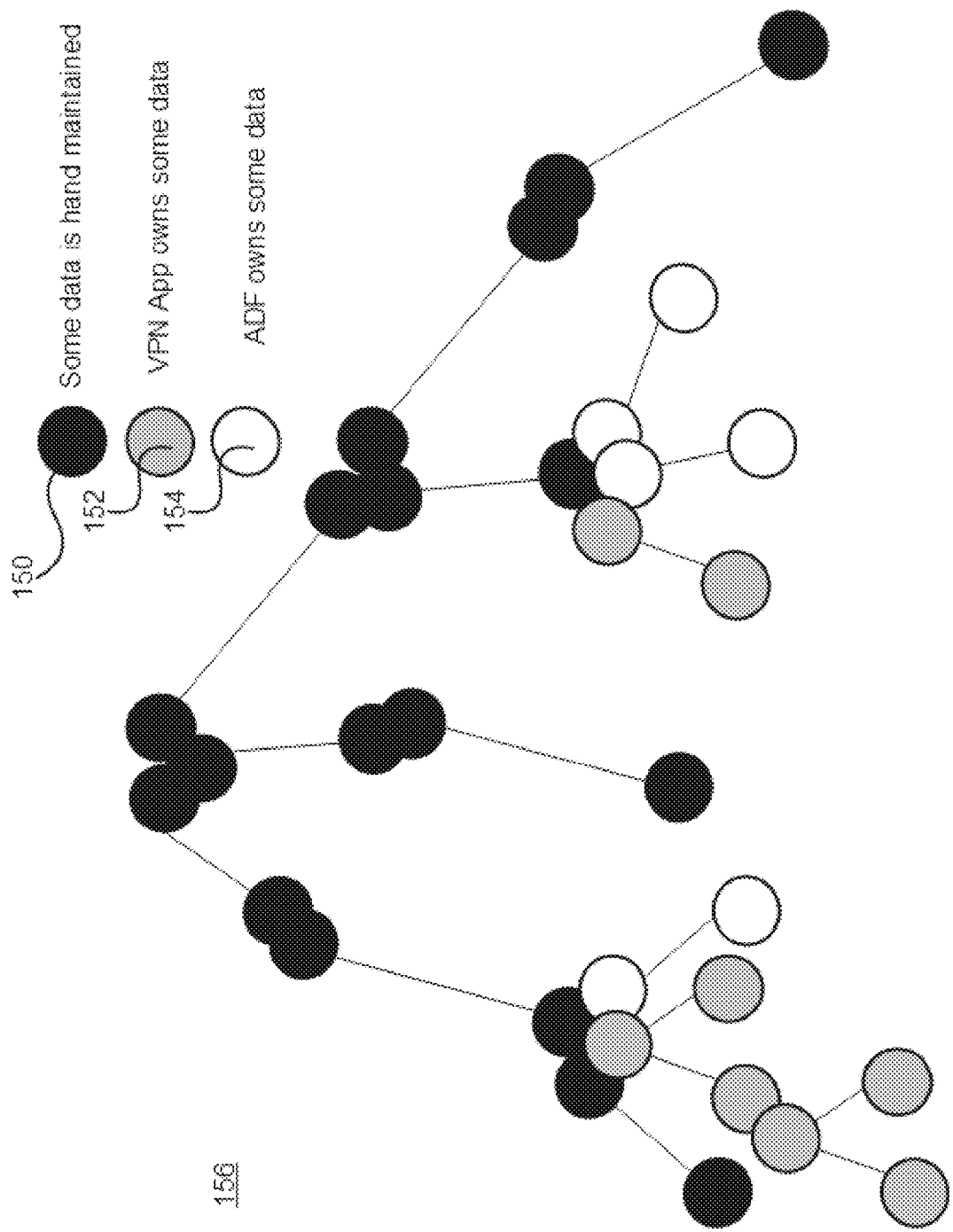
FIG. 5 is a graph showing the relationship between different sets of data and the owners of these data sets.

This spreads the responsibility for configuration of the network across layers. As shown in FIG. 5 different configuration information 150, 152, 154 may be differently maintained. In a network 156 which uses network operator configuration of resource availability, some of this configuration information 150 will be effectively hand maintained. The Application 108 may contain some of the configuration data 152 associated with the type of connections and configurations it requires. For example, the application 108 may store information 152 associated with configuration of a proxy server through which the UE based application 108 component accesses an application server. The ADF 102 can also store configuration information 154 that has been provided by another network entity. In the above example of a proxy server, the ADF 102 may store configuration information 154 that associates a particular proxy server with a given Radio Access Network, so that a component of an application 108 executed on a UE 106 that connects to a first RAN will be directed to a first proxy server, and the proxy server will be provided the relevant configuration information 154. When the same UE 106 connects to a different RAN, the ADF 102 can direct the UE 106 to a different proxy server, but still configure the new proxy server. The particular configurations associated with ADF maintained data 154 may be different between two different proxy servers, but this can be accommodated by providing the UE 106 with configuration information as well. The ADF 102 may also format instructions to different proxy servers differently based on the needs of the proxy server. In the event of a network outage, where connections need to be re-configured, between the Application 108 and the ADF 102, information can be provided to a network orchestrator that allows it, with its knowledge of the network topology, to configure the links and virtual nodes to allow for bringing the UE-to-application connections back to life.

Figure 6:
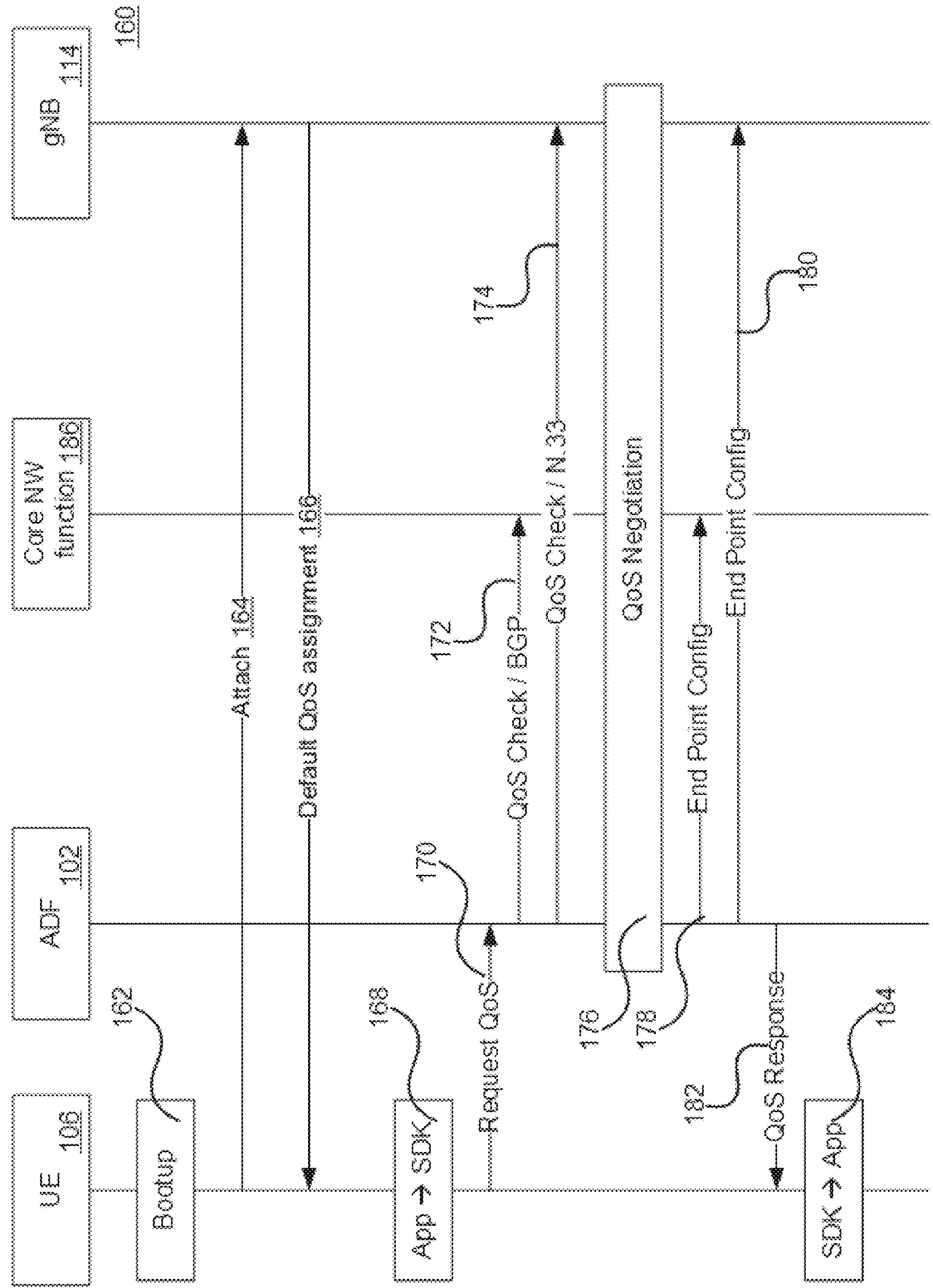
FIG. 6 is a network call flow diagram illustrating a method of messaging according to an embodiment of the present invention.

FIG. 6 illustrates an exemplary call flow 160 in which the ADF 102 aids in the configuration of the UE-to-Application connection. The UE 106, upon initiation or bootup 162, issues an attach request 164 to the gNB 114, which causes the UE 106 and gNB 114 to undertake a connection negotiation process that is well defined in the mobile network standards. This will provide the UE 106 with an over the air connection to the gNB 114 with a default QoS provided by a Default QoS assignment 166. When the UE 106 initiates 168 an application 108, which requires access to a resource accessed through the network with a defined QoS, the UE 106 (or an application 108 executed on the UE 106) initiates a connection to the ADF 102 to request the required QoS 170. This connection 170 to the ADF 102 provides the ADF 102 with certain information, including an identification of the network or gNB 114 to which the UE 102 is connected, and the application 108 with which it wants to connect (or an indication of an IP address to which it should connect with connection parameters that will define the necessary QoS).

The ADF 102 issues a QoS Check 172 with a network entity 186 (such as an orchestrator) to determine the available QoS levels. This may involve the ADF 102 providing connection requirements and receiving a 5G QoS Indicator (5QI) which is similar to the QCI used in earlier generations of networks including those under the LTE banner. Alternatively, there may be a request for a listing of the different QoS levels, allowing the ADF 102 to select one of the various QoS levels for use. A similar QoS check 174 may be transmitted to the gNB114. This message is optional if the ADF 102 is communicating with an entity that can address both QoS checks.

A QoS negotiation 176 between the ADF 102, the gNB 114 and with core network functions 186, such as BGP nodes may be undertaken. In some embodiments this is a negotiation with a control plane or management plane entity, such as an orchestrator that can configure the core network elements 186 and gNB 114 according to the result of the negotiation. The ADF 102 or the orchestrator can then send end point configuration information 178, 180 towards the core network elements 186 and the gNB 114 or other RAN elements.

A QoS response 182 can be sent to the UE 106 to allow for UE configuration 184. In some embodiments this may be configured by the ADF 102 and sent to a management plane or control plane entity, so that a node within the core network control plane, such as an AMF or SMF, can transmit a configuration response to the UE 106. A configuration response from the AMF or SMF may include a re-attach instruction causing the UE 106 to connect to a different network slice that supports the QoS levels it requires for this connection. It should be understood that the UE 106 does not necessarily have to drop an existing connection to the network if it can support access to multiple network slices.

At the end of this process, the UE 106 can connect to the Application 108 with a channel that has the characteristics required to allow the desired connection.

The ADF 102 as discussed herein allows for a number of different services to be provided. By acting as an abstraction layer between applications 108 and the network functions that carry out services relied upon by the applications, the ADF 102 can also insulate both the applications and network functions from changes in each other. In one example, applications submit requests to the ADF 102, which then maps the request to specific network functions, and then transmits a request to the network function, formed in accordance with the received request but formatted for the selected network function. If the underlying network function is replaced with either an updated version of the network function, or by a comparable function from another vendor, this is hidden from the application. A change in the format of requests handled by the network function has no impact on the application. This allows the network operator to upgrade equipment, use equipment and software from different vendors, and relocate network functions without having to worry about these changes breaking the applications that rely on these functions. These changes are only made visible to the ADF 102, and the ADF-to-application interface remains constant.

It should be understood that the interfaces between the ADF 102 and various network functions may make use of standardized interfaces to the NFs such as those detailed in 3GPP TS23.501, and may make use of corresponding procedures as outlined in TS23.502. It should also be understood that if the NF supports a proprietary interface that may offer additional functionality, the ADF 102 can support both the standardized and proprietary interfaces.

The ADF-to-Application interface may make use of a RESTful interface making use of standard HTTP messaging between the application 108 and the ADF 102, it may make use of Javascript Object Notification (JSON), or any of a number of other messaging models. The API can be modified to provide access to new functionality in underlying network elements and functions, without breaking the design of the applications. In some embodiments, different versions of the ADF API may be maintained to allow for differentiated levels of control or to enable new functionality without rendering applications incompatible. The ADF-network element interface can, as noted above, make use of both standardized and proprietary interfaces where needed.

Figure 7:
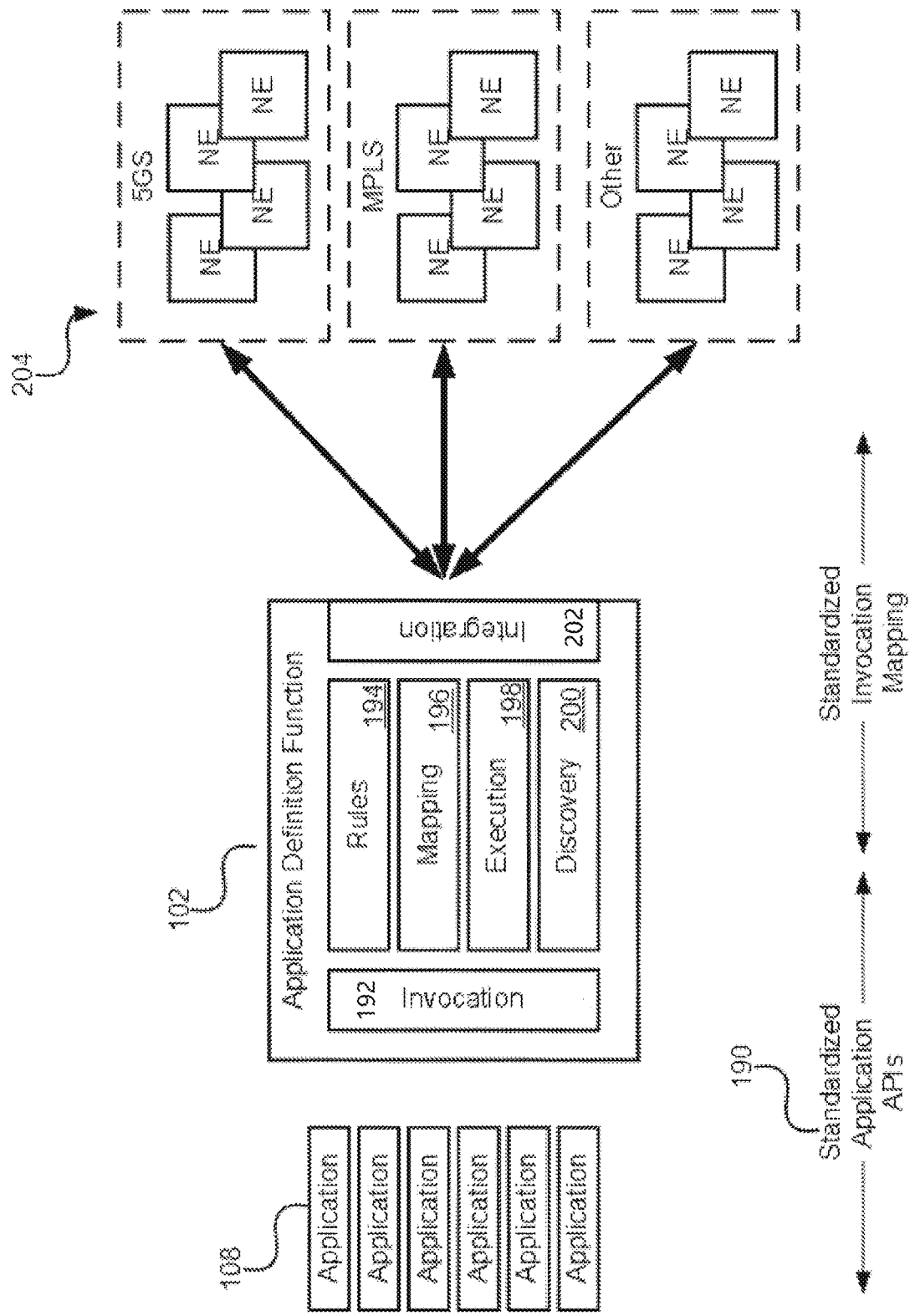
FIG. 7 is a block diagram illustrating a connectivity model according to an embodiment of the present invention.

FIG. 7 illustrates an abstract model of such an interface. A series of applications 108 can interact with the ADF 102 through a publicly defined API, which may take the form of a standardized application API 190. This API 190 may be expanded and modified over time, but maintaining backward compatibility over time may provide maximum benefit to application developers. The network address associated with the ADF 102, may remain constant over time or the ADF 102 can simply remain discoverable to the application 108. When an application 108 connects to the ADF 102 it makes use of an invocation of the ADF functionality. This invocation interface 192 may also include a function that allows the ADF 102 to provide an API update to the application 108, or to notify an application developer of updates to the API 190.

The ADF 102 maintains a set of rules 194, and mapping values 196 that allow it to process application requests to determine how they should be expressed in requests to the available network functions 204. This may involve both discovery 200 of the network functions 204 currently available, and the execution 198 of the rules 194 associated with the discovered network function to determine if the application 108 or UE 106 has access to the discovered function 204, before mapping 196 a received request to a generated request. Different network technologies and communication models may be used to interact with the network elements. If the network element in question has a defined 3GPP interface, the 3GPP networking interfaces may be used with standardized API calls. In some embodiments, network functions 204 may be selected and the ADF 102 may create a service chain of functions. This service chain can be defined using Source Routing, or (as illustrated) Multi-Protocol Label Switching (MPLS) which may help navigate parts of the service chain that are outside the bounds of the 3GPP network functions. Other network models and interactions can be supported using different protocols, without changing how the application submits requests or receives responses.

In many of the above discussions, network characteristics such as QoS have been discussed. It should be understood that this has been done for the sake of simplicity in explaining how one service characteristic is managed. Any request for network service that can be characterized and supported by underlying network elements 204 could be similarly handled by the ADF 102. In one example, a high priority application 108 may interact with the ADF 102 to initiate a new network slice. In one such example, Law Enforcement or other such emergency service may have an application 108 that is only used in certain circumstances, but that provides access to a network slice to a limited number of UEs 106. Depending on a geographic location of the initiating UE 106, the underlying network elements 204 that would generate a new network slice may vary. The ADF 102 could receive a request for a service that should be carried over a new network slice. This service request may not specify that it should be a new network slice, but instead simply indicate a session ID that is not mapped to a slice. This can be treated as the application requesting a new slice. Subsequent application instances 108 on different UEs 106 may provide the same session ID, and then be provided the network slice ID generated for the initial request. This would allow for the generation of slices and the sharing of access to the slice to a limited number of entities, without requiring user configuration of an application on a UE.

As the situation associated with the creation of the network slice evolves, other application requests can be received that would modify characteristics of the network slice. These may include application calls for more bandwidth, different latency, different encryption or security functions, and other such characteristics. The ADF could receive the initial request and provide the requesting application with the required sessions without the UE or application being aware of whether a new network slice was being created, or if an existing one was being used.

Figure 8:
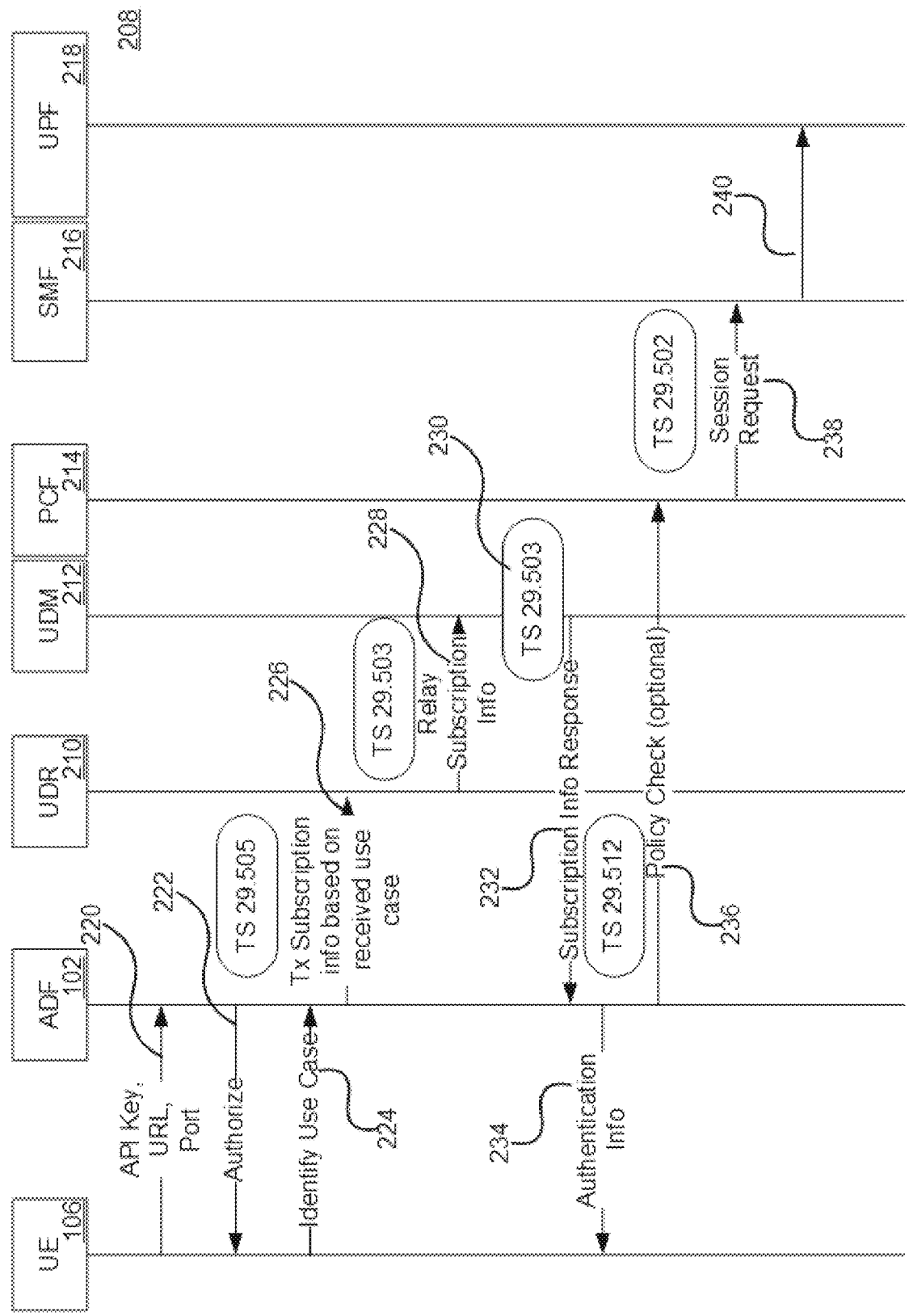
FIG. 8 is a network call flow diagram illustrating a method of messaging according to an embodiment of the present invention.

FIG. 8 illustrates a call flow resulting from a method 208 that may be executed or driven by ADF 102. ASD 102 receives from US 106 a message 220 identifying the API or API version that it is receiving (this may be explicitly or implicitly defined) along with a resource identifier (e.g. the URL and port number) for the application or the application server. The ADF 102 authenticates and authorizes the request, providing the UE 102 with an authorization message 222. The UE then transmits a message 224 identifying the use case for the connection, which may be an identification of an existing use case in a standard document such as TS 29.505. Based on the received use case, the ADF 102 transmits a subscription request 226 to UDR 210, this request may be formatted in accordance with TS 29.505 in some embodiments. The UDR 210 relays the subscription request information 228 to the UDM 212, which processes the request, for example, through defined procedures such as those defined in TS 29.503. A response 232 is then transmitted back to the ADF 102, in some embodiments this is done in accordance with defined procedures. The ADF 102 then provides authentication information 234 to the UE 106, and optionally transmits a policy check 236 to the PCF 214. The PCF 216 cna then transmit a session request 238 to the SMF 216, which then transmits a session initiation request 240 to the responsible UPF 218.

Figure 9:
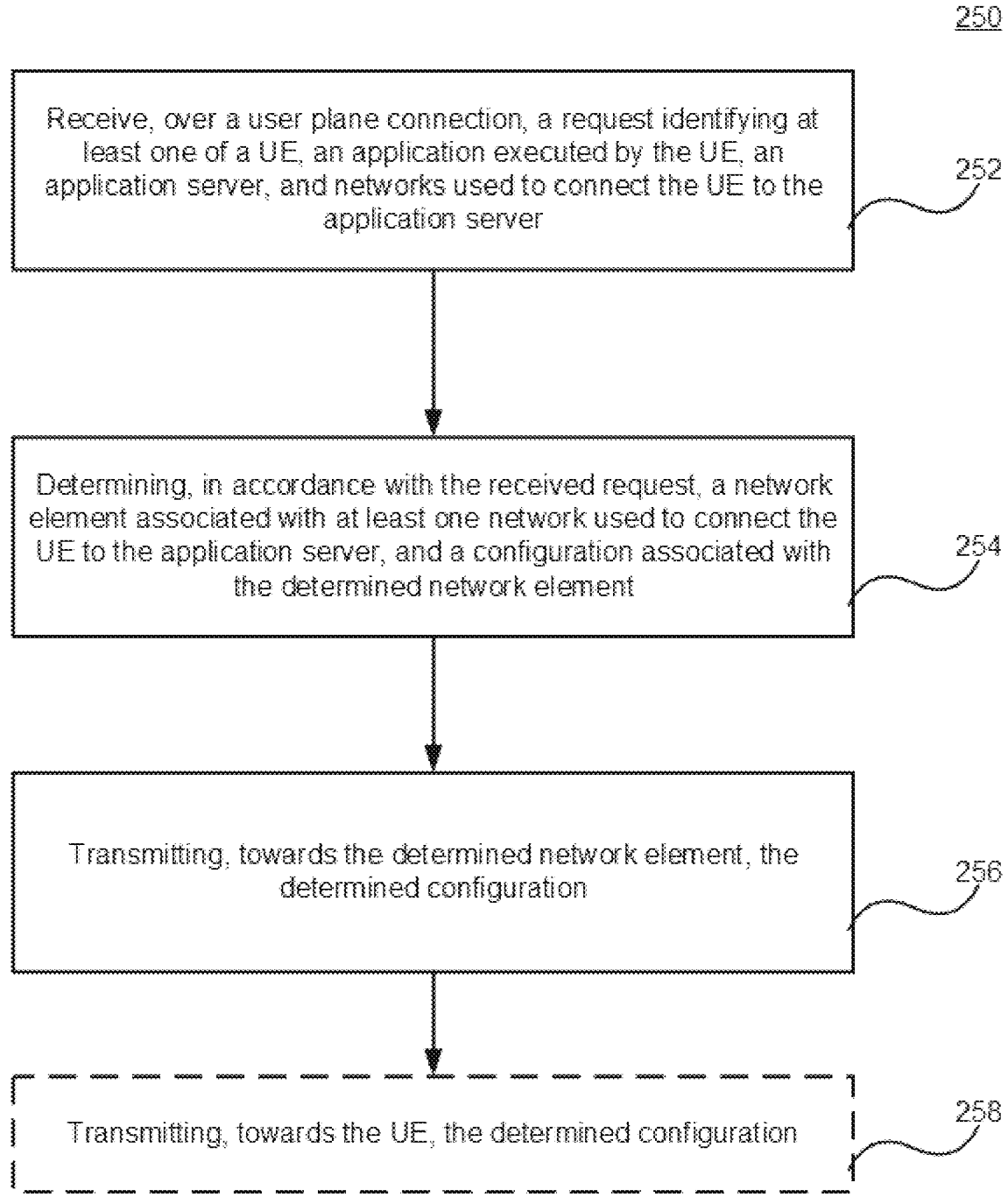
FIG. 9 is a flow chart illustrating a method of configuring a network element according to an embodiment of the present invention.

FIG. 9 illustrates a flow chart of a method 250 that may be executed by an ADF 102 as described above. In a first step, the ADF 102 receives a request 252 from the UE 106 based application. This request is received over a user plane (also referred to as a data plane) connection. This request will typically contain information such as identification of a server that the UE 106 should connect to. This may also be deduced by the ADF 102 in accordance with an application identifier provided by the UE 106. The network through which the UE 106 is connecting may also be explicitly identified, or it may be determined by the ADF 102. Subsequently, the ADF 102 can identify 254 a network element that should be configured for the UE-to-Application Server connection. Then a configuration parameter associated with the network element can be identified and determined. This determination 254 can be done based on the requirements of the UE 106, its application 108, the resources available within the network, and the application server. The determined configuration, or configuration parameters, can then be transmitted 256 towards the network element, and in some optional embodiments a corresponding configuration can be sent to the UE 106 (over an existing user plane connection) 258. The transmission 256 of the configuration parameters may be transmitted to the network element through one or both of a management plane or control plane node or function. In one such embodiment, the ADF 102 can transmit instructions identifying the network element and the required configuration information to a management plane entity. This may be part of a negotiation process or it can be a strict instruction. The management plane entity may send instructions to a network orchestrator that can either instantiate a network element, or re-configure an instantiated network element. Alternatively, the ADF 102 may transmit instructions to a management plane entity that communicates with a control plane function to implement the determined configuration. The ADF 102, upon receipt of confirmation, can send instructions to the UE 106 so that the UE 106 will be able to properly make use of the configured network element. If the ADF 102 negotiated with a management plane or control plane entity, it may modify the instructions that it would have otherwise sent to the UE 106 or UE-based application.

Those skilled in the art will appreciate that in the above described flow chart, the ADF 102 may receive a request 252 from the application on the application server, and upon configuring the network elements, the ADF 102 may store this information so that any UE 106 connecting and requesting a connection configuration for a link between the UE 106 and application server, and immediately be provided with the established configuration information without having to perform a per-UE based configuration process.

Similarly, the ADF 102 may use similar but slightly modified versions of the above described flow chart for communications initiated by any number of other nodes, servers or functions within the network.

Figure 10:
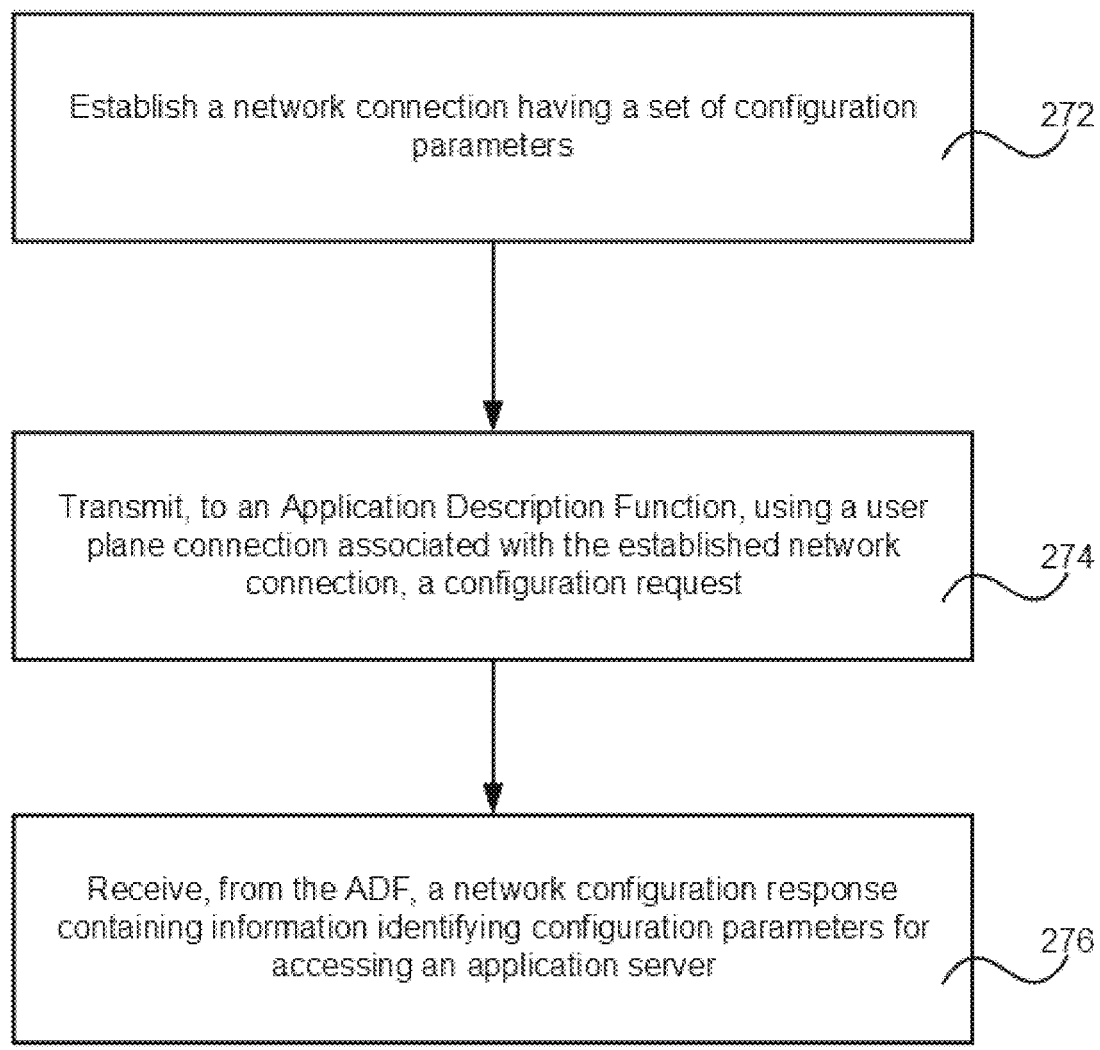
FIG. 10 is a flow chart illustrating a method of requesting configuration of a network element according to an embodiment of the present invention.

In FIG. 10, a method 270 for execution by the UE 106 hosting an application 108 is illustrated. To start, the UE 106 establishes a connection to a network 272, such as a RAN connected to a packet core network. In establishing 272 this network connection, the UE 106 is able to communicate with other nodes using a user plane connection for transmitting data. Using such a user plane connection, a request is transmitted 274 to the ADF 102. This request may identify (explicitly or implicitly) an application server to which the UE hosted application 108 is to be connected to. The request may contain other information, including an explicit identification of the access network through which the UE 106 is connected, capabilities and capacities of the UE 106, and other such relevant information. In response to transmitting this request, the UE 106 can expect to receive confirmation 276 from the ADF 102 in the form of a network configuration response that identifies the characteristics of the connection that has been established. In some embodiments, this may include an identification of a format that the application should use in communicating with the application server. Additionally, this may include identification of a particular server to connect to, a proxy server through which the application server should be accessed, or an instruction to reconnect to a different access network (possibly using provided credentials).

Figure 11:
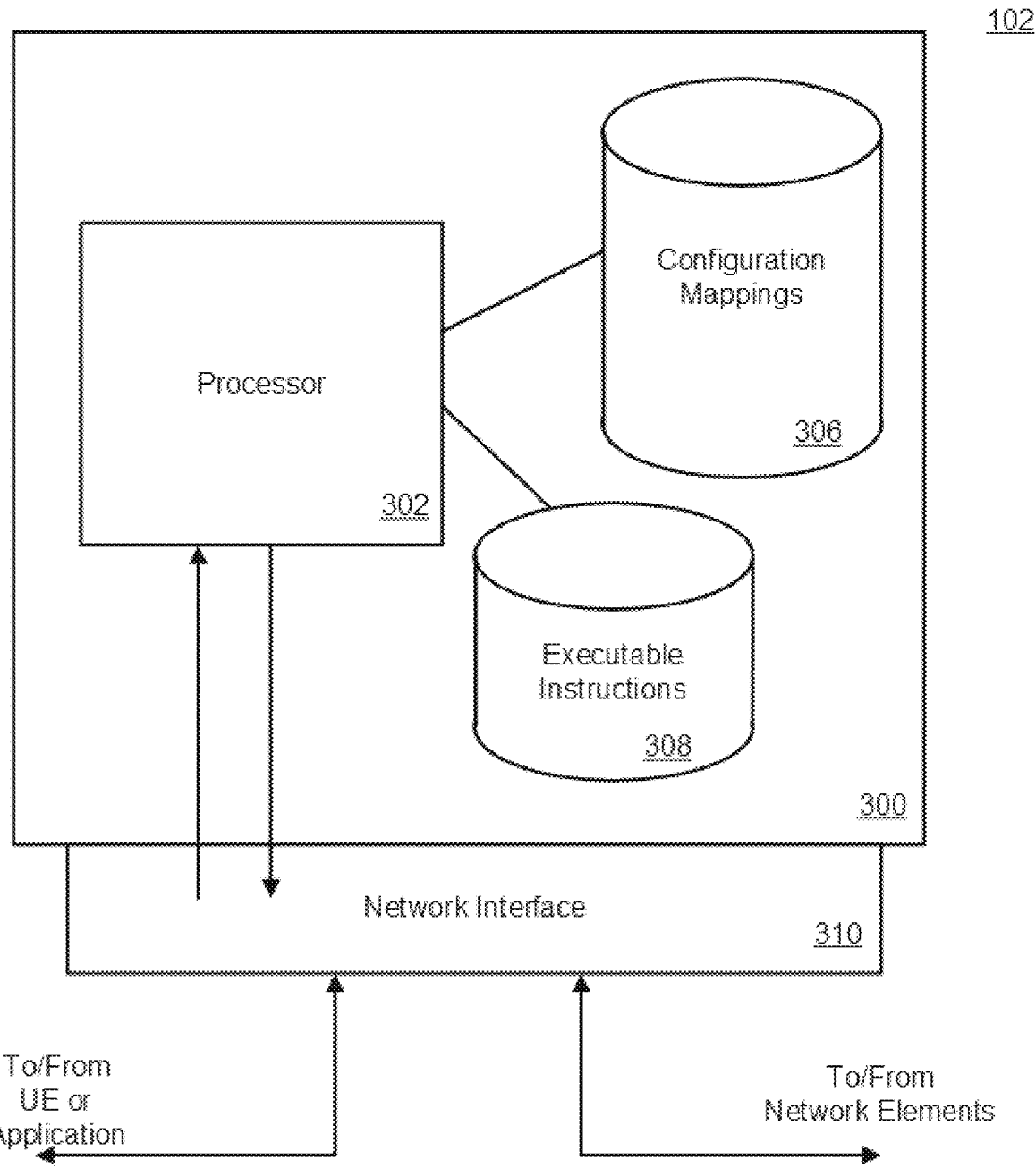
FIG. 11 is a block diagram illustrating a functional view of an application definition function according to an embodiment of the present invention.

FIG. 11 illustrates an exemplary configuration for a node 300 supporting the ADF 102 discussed above. The ADF 102 includes a network interface 310 through which the ADF 102 communicates to the UE 106 and network elements in any of the access network, the core network, and any other network between the UE 106 and the application server. The ADF 102 also includes a processor 302 which can execute instructions stored on readable media 308. These instructions, when executed by the processor 302 cause the node 300 to act as the ADF 102 in accordance with the above description. Node 300 may be a generic computing platform (either a physical node or a virtualized node) to be turned into the ADF 102 and to carry out the methods discussed above. The ADF 102 may also include a stored mapping table 306 that allows user requests to be received in a given format to be mapped to instructions that are appropriate for a selected network element. It should be understood that even network elements carrying out the same function may have different requirements for receiving confirmation information, and thus the mapping between the UE-received requests and the network element specific configuration information may be network element dependent.

As noted above, the direct connections illustrated in the drawings are provided for exemplary purposes and should not be considered limiting of the scope of the invention, which is defined solely in the claims. Nodes that are illustrated as logically connected to each other need not be directly connected as illustrated, but are illustrated as being directly connected for the purposes of explanation.

The invention claimed is:

1. A method comprising:
receiving, from a node through a first connection outside a managed network, a request associated with a second connection between nodes within the managed network, wherein the second connection is associated with a plurality of network elements within the managed network;
generating, at an application description function, in accordance with the received request, a set of configuration information comprising a plurality of element-specific configuration data subsets, each element-specific configuration data subset mapped to one of the plurality of network elements associated with the second connection; and
transmitting, towards each of the different network elements associated with the second connection, a corresponding configuration request comprising the respective element-specific configuration data subset.

2. The method of claim 1 wherein the request received from the node outside the managed network is formatted in accordance with an outward facing Application Programming Interface.

3. The method of claim 1 wherein the configuration request is received from one of an application server, a user equipment node connected to the managed network, a proxy for the application server and a proxy for the user equipment node.

4. The method of claim 1 wherein the configuration request is formatted in accordance with an Application Programming Interface (API) associated with the network element.

5. The method of claim 4 wherein the API is different than an outward facing API associated with the received request.

6. The method of claim 1 wherein the request from the node outside the managed network is received over the data plane of a network other than the managed network.

7. The method of claim 6 wherein the network element associated with the connection is within one of a control plane of the managed network and a management plane of the managed network.

8. The method of claim 6 wherein the transmitting the configuration request towards the network element comprises transmitting the configuration request to a second network element within one of a control plane of the managed network and a management plane of the managed network.

9. The method of claim 8 wherein the configuration request is transmitted towards a network orchestrator via a network entity in the management plane.

10. The method of claim 1 wherein the configuration request is transmitted towards a user equipment (UE) node connected to the managed network, and wherein the configuration request is a request for configuration of a connection associated with the UE.

11. The method of claim 10 wherein the received request is received from the UE and wherein the configuration request is determined in accordance with a second request received from an application server outside the managed network.

12. The method of claim 11 wherein the received request is associated with a connection between the UE and the application server.

13. The method of claim 1 wherein generating the configuration information further comprises generating a Quality of Service Flow Indicator (QFI) associated with the connection.

14. The method of claim 1 wherein the managed network is one of a 5G core network, a 5G Radio Access Network, an Edge Computing Network, a 4G core network, a radio access network, and a Wi-Fi network.

15. The method of claim 1 wherein the connection between nodes within the managed network comprises a plurality of connections spanning different managed network segments.

16. The method of claim 15 wherein connections in the plurality of connections comprise at least one of: a connection between a UE and a base station; a connection between a UE and a radio access point; a connection between a UE and a gNodeB; a connection between the gNodeB and a User Plane Function (UPF); a connection between the gNodeB and a gateway; a connection between two UPFs, and a connection between a gateway and a UPF.

17. The method of claim 1 wherein the connection between nodes within the managed network comprises a connection associated with an Internet of Things (IoT) device.

18. An Application Description Function (ADF) for generating configuration requests associated with connections within a managed network in accordance with requests received from outside the managed network, the ADF comprising:

a first network interface for receiving requests from outside the managed network;

a second network interface for transmitting a plurality of requests to a plurality of different network element within the managed network associated with a connection; and a processor for executing instructions stored on a computer readable medium that when executed cause the ADF to carry out the method of claim 1, including generating a set of configuration information comprising a plurality of element-specific configuration data subsets, and transmitting a corresponding configuration request comprising a respective element-specific configuration data subset to each of the different network elements.

* * * * *